Patented June 21, 1949

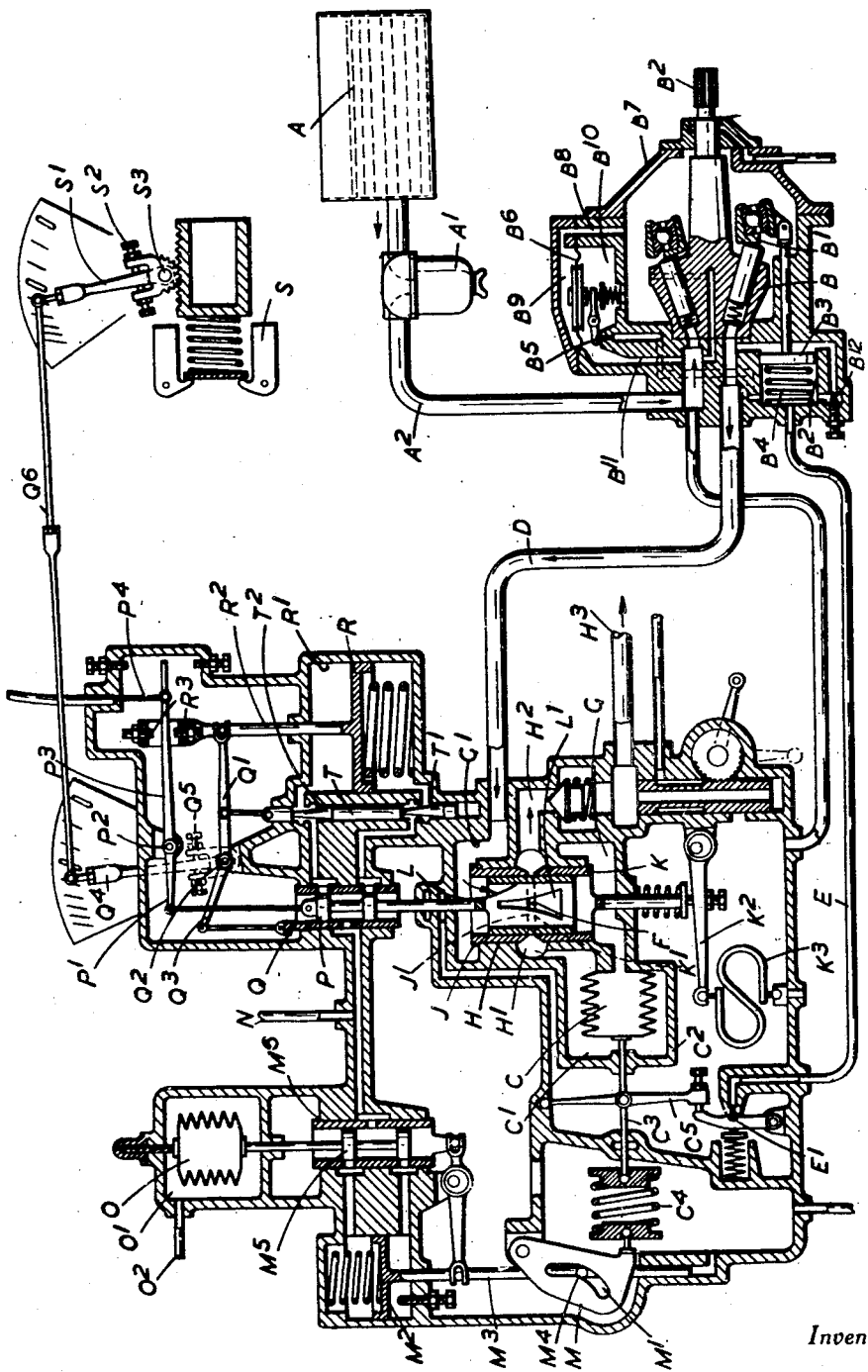

2,474,033

UNITED STATES PATENT OFFICE 2,474,033

APPARATUS FOR METERING THE FUEL SUPPLIED TO PRIME MOVERS

Reginald Henry Douglas Chamberlin and Charles Horace Lionel Wynne, London, and John Skellern, Northolt, England, assignors to D. Napier & Son Limited, London, England, a company of Great Britain Application September 26, 1947, Serial No. 776,192
In Great Britain September 30, 1946

3 Claims. (Cl. 103—38)

This invention relates to apparatus for metering the fuel supplied to a prime mover unit of the type comprising a compressor which delivers air to one or more chambers wherein the fuel is burnt, the products of combustion from these chambers flowing to and acting on a turbine which drives the compressor.

The object of the present invention is to provide means for effecting automatically the metering of the fuel supplied to the burners of the combustion chambers of a prime mover of this type in accordance with certain factors associated with the operation of the prime mover more especially when this is installed in an aircraft and drives a propeller.

The improved apparatus according to this invention comprises in combination a) metering orifice the dimensions of which in directions at right angles are determined by two relatively movable members, a variable delivery pump which delivers fuel to this metering orifice and is driven by and thus in speed relation to the prime mover, a tank whence fuel is supplied under pressure to the pump, means for moving and setting in relation to the metering orifice one of the said members which determines the dimensions of this orifice, the movements of this member being in accordance with the temperature of the air entering or passing through the compressor of the prime mover, means for manually moving the second of the said two members which determine the dimensions of the metering orifice, a servomotor operative to set the airscrew or other governor and thereby control the speed, a valve controlling the flow of pressure fluid to the said servomotor and connected to and manually moved with the said second metering orifice member, at least one valve actuated by the piston of the servomotor as it moves and controlling the flow of pressure fluid to that servomotor in a manner which will delay its action on the governor, a second servomotor controlled by atmospheric pressure at the intake to the compressor of the prime mover and operating to vary the action of a member which is subjected on the one hand to the pressure of the fuel as delivered by the pump and on the other hand and oppositely to the pressure of the fuel which has passed through the metering orifice, and means by which movement derived from this member determines the volumetric delivery of the fuel pump.

In the preferred construction the metering orifice is constituted by a passage whose cross-sectional area is determined by the sliding movements of two sleeves in relation to each other and at least one port in a cylinder in which the sleeves are concentrically disposed. In one of these sliding sleeves is at least one port shaped so that as the sleeve slides it will vary the dimensions of the metering orifice or passage in the circumferential direction with respect to the common axis of the sleeves. The second sleeve surrounds and slides on the first and ported sleeve and as its end moves over the port in the inner sleeve and one or more ports in the wall of the enclosing cylinder, the outer sleeve effects a variation in the dimension of the metering orifice, that is the cross-sectional area of the passage, in the direction of the common axis of the sleeves. By suitable means the outer sleeve is caused to slide and is set in relation to the port in the inner sleeve in accordance with the temperature of the air entering the turbine-driven compressor.

The variable delivery fuel pump driven by the prime mover is conveniently of a known type rotating in a casing in which a pressure is thereby set up due to centrifugal force, this pressure being thus dependent on the speed of rotation of the fuel pump which bears a definite relation to the speed of rotation of the turbine in the prime mover.

The second servomotor which is controlled by the atmospheric pressure at the intake of the compressor is arranged to vary the pressure exercised by a spring which constitutes one abutment for a member, which in the construction shown is a capsule, subjected to the differential action of the pressures on opposite sides of the metering orifice. Movement derived from this capsule actuates a valve controlling the flow of pressure fluid which is operative to determine the volumetric delivery of the fuel pump as by effecting such adjustment of this pump as will vary its stroke.

Preferably the port, or each port if there is more than one, in the inner sliding sleeve is of elongated V-shape arranged with the apex of the V and the length of the port lying in the direction of the axis of the sleeve.

With this apparatus the metering of the fuel is on a selected speed basis with delayed action on the airscrew governor, and in association with pressure and temperature at the intake to the compressor of the prime mover.

While details of the apparatus may vary the accompanying drawing illustrates diagrammatically and by way of example a construction of metering apparatus which may be employed in carrying the present invention into practice. This drawing serves to show the principal features and disposition of the parts of the apparatus.

The fuel is contained in a tank A from which it is delivered under pressure to the fuel pump B, passing preferably through a filter $A^1$ and by way of the pipe $A^2$. The pump B is of the variable delivery type and may be as illustrated of a known construction in which the variation of the stroke of the pump is effected by altering the angular position of a swash plate $B^1$ in relation to the axis of the pump shaft $B^2$. The pump is driven by suitable means either directly or indirectly from a rotating part of the prime mover which, as mentioned above, is of the type including a turbine driven by the products of combustion from one or more chambers wherein fuel is burnt in air delivered thereto by a compressor driven by the turbine. The variation in the stroke of the pump is effected by a servomotor mainly controlled by means to be described hereunder, these means being dependent on movement derived from a capsule C subjected to the differential action of the pressures on the opposite sides of the metering orifice. An abutment for the capsule C is adjustable in a manner to be described and in dependence on the air pressure at the entry to the compressor of the prime mover, this air pressure being commonly referred to as the ram pressure. The servomotor which determines the stroke of the pump B comprises a cylinder $B^2$ in which moves a piston $B^3$ connected to the swash plate $B^1$, a spring $B^4$ acting on one side of this piston. The pump B delivers fuel through the delivery pipe D, and the servomotor which determines the stroke of the pump B comprises a cylinder $B^2$ in which moves a piston $B^3$ connected to the swash plate $B^1$, a spring $B^4$ acting on one side of this piston. The end of the servo cylinder $B^2$ remote from the spring $B^4$ is connected to the delivery side of the fuel pump and hence is subject to the pressure in the pipe D (hereinafter called the metering pressure) while the end of the cylinder $B^2$ which contains the spring $B^4$ is connected to a port controlled by an overspeed control valve $B^5$ and also by a pipe E to a valve $E^1$ which is influenced through a lever $C^5$ and rod $C^3$ by metering pressure and ram in a manner more fully described later.

The two ends of the cylinder $B^2$ are in continuous communication with one another through a bleed valve $B^{12}$ which under normal conditions allows a small continuous leakage of fuel from the high pressure side to the low pressure side of the piston $B^3$ and thence through the valve $E^1$, the function of the apparatus in controlling the metering pressure being briefly as follows:

If under any given stable conditions of operation there is an increase in the pressure of fuel delivered by the pump B, that is to say in the metering pressure, this influences the valve $E^1$ as hereinafter described so as to open this valve and hence tend to reduce the pressure in the left hand end of the cylinder $B^2$. This causes the piston $B^3$ to move to the left and thus reduce delivery of the pump B and hence restore correct metering pressure. Similarly a reduction in the metering pressure during stable running conditions causes the valve $E^1$ to be closed slightly so as to cause a rise in the pressure in the left hand end of the cylinder $B^2$ and hence move the piston $B^3$ to the right to increase the delivery of fuel to restore the metering pressure.

It will thus be seen that during normal stable running conditions, there is a continuous leakage through the valve $B^5$ and the valve $E^1$ and that due to the slight disturbances which occur even during stable running conditions, the piston $B^3$ will in practice be in a state of floating movement within very small limits to maintain correct metering pressure. Further on the occurrence of any change in the operating conditions the piston $B^3$ will be automatically moved by the disturbance thus produced in the pressure balance on its two faces so as to adjust the fuel delivery to that required to produce and maintain the correct metering pressure under the new conditions.

In addition the piston $B^3$ can be controlled by the overspeed control valve $B^5$ actuated in known manner by the difference in pressure on opposite sides of a diaphragm $B^6$ so that the delivery of the pump B is automatically reduced on the occurrence of overspeeding. As will be seen one of the pressures acting on the diaphragm $B^6$ is that supplied to the pump through the pipe $A^2$ while the other is determined in relation to the speed at which the pump is working, that is to say the speed of the prime mover. This speed-indicating pressure is obtained in known manner by enclosing the pump in a casing $B^7$ wherein as the pump rotates it sets up pressure due to centrifugal force, this pressure thus having a direct relation to the speed of the prime mover. The pressure within the casing $B^7$ acts through a passage $B^8$ and a space $B^9$ on the side of the diaphragm $B^6$ remote from that on which the pressure in the pipe $A^2$ acts. Thus on the occurrence of overspeeding the increased pressure thus created in the space $B^9$ causes the diaphragm $B^6$ to open the valve $B^5$ and thus reduce the pressure in the left-hand end of the cylinder $B^2$ so that the piston $B^3$ moves to the left to reduce the delivery of the pump B.

The metering orifice F is preferably constructed and arranged in the following way. Within a chamber G in a closed casing $G^1$ into which the fuel is delivered from the pump through the pipe D there is mounted a cylinder H which is open at both ends so that the fuel delivered into the chamber G can freely enter the cylinder. About the centre of the length of this cylinder is an annular opening $H^1$ in the wall of the cylinder constituting a port whence runs a passage $H^2$ through which the metered fuel flows to the burners by way of the pipe $H^3$. This annular port $H^1$ also communicates with the space $C^1$ in the chamber $C^2$ in which is the capsule C. The fuel flows through the port $H^1$ after it has passed through the metering orifice F. In one end portion of the cylinder H is a fixed sleeve J, the straight inner end $J^1$ of this sleeve lying in a plane normal to the axis of the cylinder and cutting across the annular port $H^1$. In the other end portion of the cylinder is a sliding sleeve K whose inner edge $K^1$ which is straight lies opposite to the edge $J^1$ of the fixed sleeve and similarly extends across the port $H^1$. Movement of the sleeve K relatively to the sleeve J varies the width of the gap between the adjacent edges $J^1$ $K^1$ of these sleeves and thus alters the dimension of the metering orifice F in the direction of the axis of the cylinder H. The sleeves J and K have internally the same diameter and together form a cylinder in which can slide an inner sleeve L in the wall of which is a V-shaped port $L^1$. The gap between the adjacent ends $J^1$ $K^1$ of the sleeves J and K extends circumferentially through 360° but only a part of this gap is open or uncovered by the port $L^1$ in the inner sleeve L. The variation in the width of this port, that is in the circumferential direction, enables the circumferential measurement of the metering orifice F to be varied as the sleeve L slides.

Movement is imparted to the sleeve K through a lever $K^2$ acted on by a Bourdon tube $K^3$ in communication with a thermometer situated in the air intake to the compressor of the apparatus so that the sleeve K will be moved and the dimension of the metering orifice F varied in the axial direction in accordance with this temperature.

The port $L^1$ in the inner sleeve L is as mentioned V-shaped with its apex extending in the direction of the axis of the sleeve. This port may be said to resemble in shape an isosceles triangle having a short base and with sides which are not straight but are similarly curved inwards towards each other. When the sleeve L is in its initial position of rest the centre part of the length of this port lies across the gap between the adjacent ends of the sleeves J and K. Thus as mentioned sliding movement of the sleeve L will vary the dimension of the metering orifice F in the circumferential direction.

The pressure-sensitive capsule C, which may be designated the metering pressure capsule, is internally in communication with the chamber G which contains fuel at the pressure at which it is delivered through the pipe D from the fuel pump B. As mentioned the pressure in the chamber $G^1$ in which lies the capsule C is that of the fuel which has passed through the metering orifice F. In some cases the exterior of the capsule C may be subjected to the pressure of the fuel as delivered through the pipe D while the interior of this capsule may be subjected to the pressure of the fuel after it has passed through the metering orifice F. At one end this capsule bears against a fixed abutment but the other end is connected to a spindle $C^3$ on the outer end of which acts a spring $C^4$ and the pressure exerted by this spring can be varied in a manner to be described hereunder. Through a lever $C^5$ connected to the spindle $C^3$ the capsule C can act on the valve $E^1$ controlling the leak-off from the pipe E running from the servomotor $B^2$ $B^3$. A spring tends to move the lever $C^5$ in a direction which will keep the valve $E^1$ on its seat.

The load exerted by the spring $C^4$ on the capsule C can be varied by movement of a lever M in which is a cam slot $M^1$. The piston $M^2$ of a servomotor has a rod $M^3$ carrying a pin $M^4$ which engages the cam slot $M^1$. Pressure fluid supplied through a pipe N can act on the piston $M^2$ according to the positioning of a piston valve $M^5$ and a ported sleeve $M^6$ in which moves the valve $M^5$. The valve $M^5$ is connected to an evacuated capsule O in a chamber $O^1$ the interior of which through a pipe $O^2$ is subjected to the ram pressure.

From the inner ported sleeve L runs a rod connected to a piston valve P which can reciprocate in a ported sleeve Q which itself can slide in relation to ports in the wall of a fixed cylinder. The piston valve P in accordance with the setting of the ported sleeve Q determines the flow of pressure fluid from the supply pipe N to and from a servomotor comprising a piston R in a cylinder $R^1$, this piston being operative with delayed action on the air screw governor S. The piston valve P is connected to one arm $P^1$ of a two-armed lever pivoted at $P^2$, the second arm $P^3$ of this lever being connected through a flexible connection $P^4$ to the pilot's control so that manual setting of the valve P is possible in accordance with selected speed. Movement of this valve P involves a setting of the ported sleeve L which determines the cross-sectional area of the metering orifice F. At the same time as the valve P is moved it will control the flow of pressure fluid to the servomotor R $R^1$ and through levers $Q^1$ and $Q^4$ and rod $Q^6$ effect a setting of the air screw governor S. The piston rod $R^2$ of this servomotor is connected to one arm $Q^1$ of a two-armed lever pivoted at $Q^2$, the second arm $Q^3$ of this lever being connected to the ported sleeve Q. The arm $Q^1$ of this lever is connected to a sliding member T which carries two similar conical portions $T^1$ $T^2$ which function as needle valves with a throttling effect on the flow of fuel under pressure to the opposite sides of the piston R in the servomotor cylinder $R^1$. The pivot $Q^2$ of the two-armed lever $Q^1$ $Q^3$ is a rock shaft which carries projecting therefrom a lever $Q^4$ whose angular position in relation to the lever $Q^1$ $Q^3$ is adjustable by the studs $Q^5$ while the length of the lever $Q^4$ is also variable. From the end of the lever $Q^4$ runs a link $Q^6$ adjustable in length to a lever $S^1$ through which the setting of the air screw governor S is varied in a known manner to determine the speed by altering the pitch of the blades of the propeller driven by the prime mover. This lever $S^1$ is conveniently adjustable in length and also through the studs S in its angular position with respect to the shaft $S^3$ on which it is mounted and which is turned by movement of the lever $S^1$.

Though as mentioned above the sleeve J may be fixed, it is to be understood that under certain circumstances this sleeve may be arranged so that its position in the cylinder H is adjustable.

In some cases it may be desirable to provide the sliding ported sleeve L with more than one port. For instance, in this sleeve there may be two preferably similar ports placed conveniently in diametrically opposite positions, each port then having an area which is one-half of the area of the single port. Like the single port described above each of these two ports is shaped somewhat if not exactly like an isoscles triangle with a small base. For example, each port may be shaped as one-half of the single port $L^1$ when the latter is divided longitudinally by a straight line running from the centre of the base to the apex, but the separate ports may be otherwise shaped if desired.

There may be provided a shut-off device of known type in the passage $H^2$ $H^3$ through which the fuel flows after passing through the metering orifice F on its way to the burners.

Surge-control fuel stops $R^3$ may be provided, these stops as shown being carried by the piston rod $R^2$ of the servomotor R $R^1$ and lying on each side of the lever arm $P^3$ which is connected to the pilot's control. These stops which function as under and over-fuelling stops restrain the movement of the lever $P^3$ by the pilot, and the servomotor R $R^1$ should be powerful enough to withstand attempted movement by the pilot, and the rate of admission of pressure liquid to the servomotor must be controlled so as to make these stops effective. The time delay at the servomotor R $R^1$ serves the purpose of stability in that on selecting an increase of speed by the pilot the servomotor permits the actual speed to be in advance of the speed as selected at the governor, which is necessary in order to obtain correct control of the movements of the blades of the airscrew.

What we claim as our invention and desire to secure by Letters Patent is:

1. Apparatus for metering the fuel supplied to a prime mover of a type adapted for driving a variable pitch air screw comprising in combination a metering orifice, the dimensions of which in directions at right-angles are determined by parts of two relatively movable members, a pump operative to deliver fuel in variable quantity to the metering orifice, means for driving the pump by and thus in speed relation to the prime mover, a tank containing fuel under pressure with means for supplying fuel from this tank to the said pump, means for moving and setting in relation to the said metering orifice one of the said members which determines the dimensions of this orifice, this means being actuated in accordance with the temperature of the air at the entry to the compressor of the prime mover, means for manually moving the second of the said two members which determine the dimensions of the metering orifice, a governor operative to set the airscrew and thereby control the speed of the prime mover, a servomotor operative to set the said governor, a valve controlling the flow of pressure fluid to the said servomotor and connected to and manually movable with the said second metering orifice member, at least one valve actuated by the piston of the said servomotor as it moves and controlling the flow of pressure fluid to that servomotor in a manner which will delay its action on the airscrew governor, a second servomotor with means for controlling it in accordance with the pressure of the air at the intake of the compressor to the prime mover, a member movable against a spring constituting an abutment, the member being subjected on the one hand to the pressure of the fuel as delivered by the said pump and on the other hand and oppositely to the pressure of the fuel which has passed through the said metering orifice, means whereby the said second servomotor is operative to vary the pressure exercised by the said spring abutment on the said movable member, and means whereby movement derived from the said movable member determines the stroke of the said fuel pump and thus the volumetric delivery of the pump.

2. Apparatus for metering comprising the parts as set out in claim 1 and including a member carrying two needle valves respectively controlling the flow of liquid under pressure to the opposite sides of the piston of the said servomotor which is operative to set the governor controlling the airscrew and the speed, this needle valve member being connected to and movable by a lever which is itself connected to and actuated by the piston of the said servomotor.

3. Apparatus for metering fuel comprising parts as set out in claim 1 in which there is a sliding ported sleeve, within which moves the said piston valve controlling the flow of pressure liquid to the said servomotor which is operative to set the governor controlling the speed, a lever serving as a connection between the piston of the said speed controlling servomotor and the said ported sleeve, and a connection between the said lever and a member carrying needle valves which respectively control the flow of liquid under pressure to the opposite sides of the piston controlling the speed.

REGINALD HENRY DOUGLAS CHAMBERLIN.
CHARLES HORACE LIONEL WYNNE.
JOHN SKELLERN.

No references cited.